(12) United States Patent
Girao et al.

(10) Patent No.: US 7,702,905 B2
(45) Date of Patent: Apr. 20, 2010

(54) METHOD FOR DISTRIBUTING KEYS FOR ENCRYPTED DATA TRANSMISSION IN A PREFERABLY WIRELESS SENSOR NETWORK

(75) Inventors: Joao Girao, Heidelberg (DE); Dirk Westhoff, Heidelberg (DE); Mithun Puthige Acharya, Heidelberg (DE)

(73) Assignee: NEC Corporation, Tokyo (JP)

( * ) Notice: Subject to any disclaimer, the term of this patent is extended or adjusted under 35 U.S.C. 154(b) by 1192 days.

(21) Appl. No.: 11/272,079

(22) Filed: Nov. 14, 2005

(65) Prior Publication Data

US 2007/0078817 A1      Apr. 5, 2007

(30) Foreign Application Priority Data

Nov. 30, 2004   (DE) .................. 10 2004 057 981

(51) Int. Cl.
   *H04L 29/06*      (2006.01)
(52) U.S. Cl. ...................................... 713/163
(58) Field of Classification Search .................. 713/163
   See application file for complete search history.

(56) References Cited

U.S. PATENT DOCUMENTS

2005/0140964 A1*   6/2005   Eschenauer et al. ............ 356/10

2005/0157698 A1*   7/2005   Park et al. .................... 370/351

FOREIGN PATENT DOCUMENTS

WO      WO 2004040472 A2 *   5/2004

OTHER PUBLICATIONS

Girao, et al., "CDA: Concealed Data Aggregation in Wireless Sensor Networks", Oct. 2004, ACM Workshop on Wireless Security.*
Chan et al., "Random Key Predistribution Schemens for Sensor Networks", Apr. 2003, Proceedings of the 2003 IEEE Symposium on Security and Privacy.*
Wendi B. Heinzelman, "An Application-Specific Protocol Architecture for Wireless Microsensor Networks," Oct. 2002, IEEE Transactions on Wireless Communications, vol. 1, No. 4, Oct. 4, 2002.
Laurent Eschenauer et al., "A Key-Management Scheme for Distributed Sensor Networks," pp. 41-47.

* cited by examiner

*Primary Examiner*—Nasser Moazzami
*Assistant Examiner*—Michael S McNally
(74) *Attorney, Agent, or Firm*—Young & Thompson

(57) ABSTRACT

In a method for distributing keys for encrypted data transmission in a sensor network, nodes store a subset of keys from a set of keys. A sink node triggers the key election procedure and sensor nodes choose from a locally broadcasted keyID list, with one key to be stored on each node. All other initially stored keys are subsequently deleted. The process is repeated until the edge of the network is reached. Such key predistribution is suitable for the encryption of reverse multicast traffic to the sink node which is the predominant traffic pattern in wireless sensor networks.

13 Claims, 1 Drawing Sheet

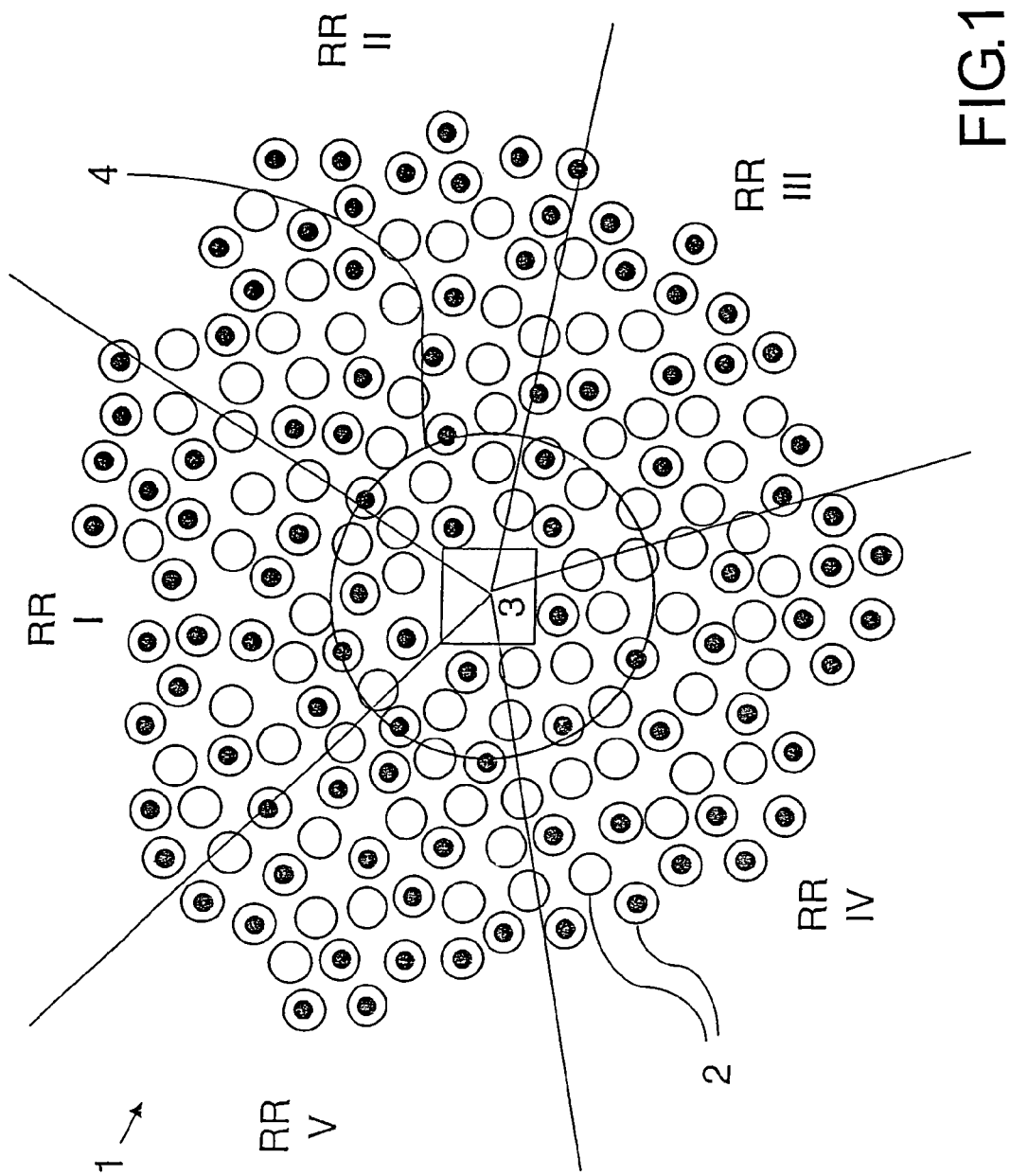

METHOD FOR DISTRIBUTING KEYS FOR ENCRYPTED DATA TRANSMISSION IN A PREFERABLY WIRELESS SENSOR NETWORK

BACKGROUND OF THE INVENTION

1. Field of the Invention

The present invention relates to a method for encrypted data transmission in a preferably wireless sensor network, wherein the sensor network comprises a multitude of sensor nodes and at least one sink node and wherein the data traffic within the sensor network converges like a reverse multicast traffic to the sink node.

2. Description of the Related Art

The usage of sensor networks is rapidly growing and they are especially used in the area of environmental monitoring, such as for purposes of examining the weather conditions, distribution of humidity or water contamination, or for purposes such as measuring the temperature of surfaces, analyzing movement patterns, controlling big industrial facilities etc. Every individual sensor of a sensor network is a sensor node which communicates—mainly in a wireless manner—with the other sensor nodes which in general consist of a sensor, a processing unit, a communication device as well as a battery. The functionalities of data acquisition, communication and computation are combined in the sensor node in a very small space.

Critical parameters which may restrict the possible fields of application of sensor networks are in particular physical restrictions of the individual sensor nodes, as for example the transmission range of their communication device, processor power, battery capacity, available storage capacity and the like. Since the individual sensor nodes—in contrast to the sink nodes where the sensed data is received—are restricted in many ways, an efficient organization of the sensor network in terms of energy consumption is especially important.

Another important aspect, which has to be taken into consideration when building up a sensor network, is the secure transmission of sensed data by the sensor node. The platform which is the base of the sensor node has in general extremely small dimensions and does in general not have a tamper resistant unit. Especially aggregator nodes which are sensor nodes, and which have the special function of collecting data from sensor nodes in their neighborhood and forward it, are an attractive aim for unwanted eavesdropping since the sensed data of a whole region of a sensor network is available and consolidated there.

In order to increase security of data transmission in sensor networks, the sensed data of the individual sensor nodes are generally transmitted in an encrypted form. To do so, in general an end-to-end encryption is chosen, i.e. the sensed data is encrypted directly at the sensor node and only decrypted after receipt at the sink node. Due to the problems discussed above, security schemes for sensor networks, as known up to now, loose their level of security if a malicious attacker is able to get knowledge of the key(s) used for data transmission.

Another increase in security in the context of data transmission in sensor networks can be achieved by special care in the key distributions. One such key distribution mechanism for pairwise secure communication is for example described in L. Eschenauer, V. Gligor, "A key-management Scheme for Distributed Sensor Networks", in the proceedings of $9^{th}$ ACM Conference on Computer and Communications Security (CCS'02), 41-47, November, 2002. According to this work, in every sensor node of the sensor network, a small number of keys are stored wherein the stored set of keys is taken out from a commonly used key pool. So, there is a certain probability that two randomly chosen sensor nodes share the same key.

In the framework of applications where data is aggregated, the known method is unusable since it only refers to a pairwise communication and is inappropriate for communication between n:1 partners.

SUMMARY OF THE INVENTION

The present invention is therefore based on the task of indicating a method for transmitting encrypted data of the above mentioned kind, which enables an end-to-end encryption of data with aggregation in the sensor network, with symmetric encryption methods, and which minimizes at the same time the amount of information an unwanted attacker can get by capturing repeatedly sensor nodes and gain knowledge of the information contained therein.

An encrypted data transmission in a preferably wireless sensor network, according to the present invention, solves the above captioned problem by the characteristics of claim 1. According to this, such a method is characterized in the following steps:

a) From the set K of possible keys k a subset K* of keys k is selected and stored in the individual sensor nodes together with corresponding key identifiers $ID_k$, b) a set of sensor nodes from the first hop to the sink node being in transmission range of the sink node selects from set K* of the stored keys k in each case a random set of keys $k_1, \ldots, k_r$, c) every sensor node of the set of sensor nodes from the first hop to the sink node stores either exactly one key k; of the selected set of keys $k_1, \ldots, k_r$ and erases all the rest of the stored keys k of set K* or erases all keys k of set K*, d) every sensor node of the set of sensor nodes from the first hop to the sink node sends a list of the key identifiers $ID_{k1}, \ldots, ID_{kr}$ corresponding to its selected set of keys $k_1, \ldots, k_r$ which is received by sensor nodes being farther from the sink node, and e) every sensor node receiving a list of key identifiers $ID_{k1}, \ldots, ID_{kr}$ stores either exactly one key $k_i$ of the set of keys $k_1, \ldots, k_r$ corresponding to the list, and erases all the rest of the stored keys k of set K* or erases all the keys k of set K*, f) the methodical steps d) and e) are successively repeated for the correspondingly sensor nodes being located farther away from the sink node until the farthest sensor node of the network is reached, and by doing so, the network is divided into areas—routable regions—in such a way that all the sensor nodes within one area have stored either exactly one or no key k; from the corresponding original selectable set of keys $k_1, \ldots, k_r$.

According to the invention, from the set K of possible keys k a subset K* of keys k are selected and stored together with the corresponding key identifiers $ID_k$ in the individual sensor nodes. Depending on the storage capacity of the individual sensor nodes, typically 100 to 250 keys are stored. So, the number of keys comprised by the subset K* is much smaller than the whole key space available.

Typically, the number of keys comprised by the subset K* is much smaller than the number sensor nodes in the network, wherein the number of keys comprised by the subset K* is in particular independent from the number of sensor nodes of the network and scales also for large sensor networks.

In a next step a set of sensor nodes from the first hop to the sink node, which is in transmission range of the sink node, selects from the set K* of the stored keys k a randomly chosen set of keys $k_1, \ldots, k_r$. The set of the sensor nodes from the first hop to the sink node is hereby defined by the transmission range of the sink node—preferably positioned in the center—and it comprises those sensor nodes which are positioned within the transmission range of the sink node.

After the random selection of the key set $k_1, \ldots, k_r$, every sensor node of the set of the sensor nodes from the first hop to the sink node stores either exactly one key $k_i$ of the chosen set of key $k_1, \ldots, k_r$ and erases all the other stored keys or it erases all the stored keys. In addition, every sensor node of the set of sensor nodes from first hop to the sink node broadcasts a list which comprises the key identifiers of the keys $ID_{k1}, \ldots, ID_{kr}$ of the key set selected by itself. According to the transmission range of the sensor nodes the lists of the key identifiers $ID_{k1}, \ldots, ID_{kr}$ are received by adjacent sensor nodes.

The method according to the invention continues in such a way that every sensor node which receives a list of key identifiers $ID_{k1}, \ldots, ID_{kr}$ either stores exactly one key $k_i$ of the key set $k_1, \ldots, k_r$ corresponding to the list and erases all the other stored keys k of set K* or erases all the keys k of set K*.

Furthermore, according to the method of the invention the methodic steps d) and e) are repeated, namely in a successive way for sensor nodes being located respectively farther and farther from the sink node until reaching those sensor nodes being located the farthest from the sink node. In other words, starting from the set of the sensor nodes from the first hop to the sink node being in transmission range of the sink node, the lists of the key identifiers $ID_{k1}, \ldots, ID_{kr}$ propagate until reaching the sensor nodes being located at the edge of the sensor network, and every sensor node receiving a list of key identifiers $ID_{k1}, \ldots, ID_{kr}$, stores either exactly one key $k_i$ comprised in the received list of key identifiers $ID_{k1}, \ldots, ID_{kr}$, and erases the rest of the keys or it erases all of the stored keys, i.e. all the keys of set K*.

Due to the method according to the invention, the sensor network is divided into different areas which in the following will be referred to as routable regions RR. Within each of the routable regions which are ideally shaped like a piece of a cake there is a defined set of keys $k_1, \ldots, k_r$ established respectively, wherein the sensor nodes within the routable region have stored either no key at all or have stored exactly one key of the set of keys $k_1, \ldots, k_r$.

The method according to the invention is optimally adapted to the specific characteristics of reverse multi-cast data traffic within the sensor network. The resulting distribution of keys is the anchor for an end-to-end encryption of the data, starting from the individual sensor nodes up to the central sink node. The method according to the invention offers an optimum of security since any active attacker who takes up individual sensor nodes and gains the knowledge of the information stored therein only gets a minimum of information regarding the whole of the network. At the same time, this method offers an optimum of flexibility regarding the routing of the network traffic.

In the context of a preferred embodiment it is provided that the storage of the subset K* of keys in the individual sensor nodes takes place during a preparation phase before the sensor nodes will be deployed. The sensor nodes could for example be pre-configured by the manufacturer, i.e. the set of keys K* could be stored in the sensor nodes together with the corresponding list of key identifiers in a secure environment to which unwanted attackers have no access.

After the sensor nodes have been deployed, i.e. after deployment of the sensor nodes in a geographical region, the process of distributing the keys can be started immediately. It should be noted that the network is easy to attack during the phase from deployment until having finished the key distribution. Consequently, the process of distributing the keys should be performed and finished as soon as possible. The distribution of keys can for example be initiated by a request originating from the sink node. The request can be received by the set of the first hop to the sink nodes which are within a short distance within the transmission range of the sink node and it can request them to start with a selection of a random set of keys $k_1, \ldots, k_r$.

In an advantageous way, the sensor nodes can be designed in such a way that they do not accept any lists of sets of key identifiers $ID_{k1}, \ldots, ID_{kr}$ after having first received a list of key identifiers $ID_{k1}, \ldots, ID_{kr}$, i.e. any subsequently received lists will be ignored. By these means, a controlled and directed propagation of the key distribution starting from the sink node and going up to the sensor nodes in the utmost outer regions of the network is ensured.

When deploying the sensor nodes in a given region, it can happen that some sensor nodes are positioned in an area of the network out of transmission range of the rest of the sensor nodes, for example in the farthest border areas of the network, and hence cannot receive a list of key identifiers $ID_{k1}, \ldots, ID_{kr}$. Such sensor nodes represent a high security risk as they have stored the whole set of keys K* and therefore endanger the whole network if detected by unwanted attackers. In order to avoid this problem, the sensor nodes can therefore be designed in such a way that their stored set of keys K* is completely erased from their memory if they do not receive a list of key identifiers $ID_{k1}, \ldots, ID_{kr}$, within a pre-set duration.

In a concrete embodiment it can be provided that the probability P with which sensor nodes do not store a key of the set of keys $k_1, \ldots, k_r$ reduces with the distance d from the sink node.

Referring to the biggest distance of a sensor node to the sink node with $d_{max}$, the probability P, for example, could be defined as $P(d, d_{max})=d/d_{max}$. Hence, $P(d, d_{max})$ is a parameter with which the density of nodes having stored sensitive data can be controlled. With $P(d, d_{max})=d/d_{max}$, sensor nodes located at the utmost edge of the network have stored a key at a higher probability than sensor nodes located centrally near to the sink node.

Basically, a sensor node within a network can act in two functions. First, it can sensor data and send its sensed data, i.e. transmit them to other sensor nodes within its transmission range. Furthermore, sensor nodes can act as relay nodes which only receive and forward data from other sensor nodes.

In the context of a particularly preferred embodiment it can be provided that some of the sensor nodes are selected as aggregator nodes which can take up another function, i.e. aggregating and forwarding the data of several sensor nodes. The selection can be performed due to pre-settable criteria, where it can in particular be envisioned to select aggregator nodes depending on the energy resources which the respective sensor nodes still can dispose of. The selection of aggregator nodes can for example be performed by the centrally working LEACH protocol (Low Energy Adaptive Clustering Hierarchy) together with a simple downstream routing protocol. The LEACH protocol is described in detail in W. B. Heinzelman, A. P. Chandrakasan, H. Balakrishnan, "An Application-Specific Protocol Architecture for Wireless Microsensor Networks", in IEEE Transactions on Wireless Communications, vol. 1, no. 4, pp. 660-670, October, 2002.

The selection of aggregator nodes can always be performed again after a pre-settable duration. The duration between two selection processes will in the following be referred to as epoch. The life cycle of the sensor network can also be divided into single epochs with the aid of the above described LEACH protocol.

Regarding the validity of the keys stored by the individual sensor nodes, it can be provided in an especially advantageous manner that in each of the routable regions RR during each epoch only one key $k_i$ of the respective set of keys $k_1, \ldots, k_r$ is valid respectively. In concrete, this means that during the single epochs only those sensor nodes whose respective key is valid can send their sensed data. The rest of the sensor nodes whose keys are not valid can—except they are chosen to act as aggregator nodes—either forward the data of other sensor nodes or, if they are badly located for example, they can enter idle mode to save power.

In order to ensure that all the sensor nodes having stored a key can send their sensed data at regular intervals, it can be provided in an advantageous manner that a cyclical change of the respectively valid keys k; of the set of keys $k_1, \ldots, k_r$ can be provided which means in mathematical terms that i=t mod r (with t referring to the $t^{th}$ epoch) . By these means it is achieved that after r epochs respectively the same keys $k_i$ will be valid.

Regarding a regulation of the number of evolving routable regions, the sensor nodes of the set of the sensor nodes from the first hop to the sink node can decide whether they choose a key set $k_1, \ldots, k_r$ on their own or whether they take the set of keys of the set of the sensor nodes from the first hop to the sink node, $k_1, \ldots, k_r$, as already chosen by another sensor node. Here, the chronology can be taken advantage of, in which the set of sensor nodes from the first hop to the sink node, i.e. the sensor nodes within the transmission range of the sink node, receives the request for initializing the key distribution from the sink node and a first list of key identifiers from a sensor node in the neighborhood which is typically located closer to the sink node.

Regarding the desired number of routable regions it has to be aimed in an advantageous way at a compromise respecting two opposite phenomena. On one hand, a high number of routable regions means that an unwanted attacker who succeeds in getting some knowledge about the information stored in a sensor node of a routable region only gets few information about the sensor network as a whole. On the other hand, a high number of routable regions also means that— from a global point of view—the probability with which two sensor nodes located in different routable regions have the same key is relatively high and increases rapidly with a growing number of routable regions. In order to find an appropriate compromise, you can refer to the classic occupancy problem, i.e. the generic case of the so-called birthday paradox. According to this, the square root of the number of keys contained in the set of keys K* represents a threshold to be fallen below regarding the number of routable regions. For example, if the storage capacity of the individual sensor nodes restricts the stored set of keys K* to about 100 keys, the optimum number of routable regions is under 10.

Now, there are several options of how to design and to further develop the teaching of the present invention in an advantageous way. For this purpose, it must be referred to the claims dependent on claim 1 on the one hand and to the following explanation of an example of a preferred embodiment of the invention on the other hand. In connection with the explanation of the preferred embodiment of the invention according to the drawing, generally preferred designs and further developments of the teaching will also be explained.

BRIEF DESCRIPTION OF THE DRAWING

FIG. 1 is a diagram showing an example of a sensor network so as to explain an operation of the encrypted data transmission method in a wireless sensor network according to an embodiment of the invention.

DETAILED DESCRIPTION OF THE PREFERRED EMBODIMENTS

FIG. 1 shows schematically a sensor network 1 which comprises a multitude of sensor nodes 2. The sensor network 1 comprises additionally a sink node 3 which is located preferably in the centre of the sensor network 1 where the data of the individual sensor nodes 2 is received. It's assumed that the sensor nodes 2 and the sink node 3 do not move in a given topological region after deployment has taken place but stay statically in their positions.

Before the deployment of the sensor nodes 2 and sink node 3, a subset K* of keys k from the set K of potential keys k is stored in the single sensor nodes 2, wherein the subset K* is chosen identically for all sensor nodes 2 of the sensor network 1.

Directly after the sensor nodes 2 have been deployed, the sink node 3 sends a request message. This message is received by all sensor nodes 2 which are located within the transmission range of the sink node 3. The transmission range of sink node 3 is indicated schematically in the figure by the circle 4. The sensor nodes 2 within the transmission range of the sink node 3 can act in two different ways: Either they choose from the set K* of the stored keys k a random set of keys $k_1, \ldots, k_r$ after having received the request message from the sink node, or they take the set of keys $k'_1, \ldots, k'_r$ which has been chosen before by a sensor node 2 (which is typically one in the neighborhood and located, closer to the sink node 3).

Such an adoption is made possible due to the fact that each of the sensor nodes 2 which has chosen a set of keys $k_1, \ldots, k_r$ broadcasts a list of key identifiers $ID_{k1}, \ldots, ID_{kr}$ according to its chosen set of keys $k_1, \ldots, k_r$. Furthermore, each of the sensor nodes 2 chooses a key $k_i$ from the set of keys $k_1, \ldots, k_r$ (corresponding to the received list of key identifiers $ID_{k1}, \ldots, ID_{kr}$) and erases the rest of the keys of the set K* or it erases all the stored keys of the set K*.

Starting from the sink node 3 up to the farthest sensor node 2 of the sensor network 1, the described method is propagated in such a way that after the distribution process every sensor node 2 has either stored exactly one key k or no key k at all. Those sensor nodes 2 that have cleansed all keys are shown in the figure as open circles, and those sensor nodes 2, which have stored exactly one key k, are marked with a black point. It is to be pointed out that the distribution process should preferably take place rather quickly since sensor nodes represent an enormous risk in security as long as they have stored the whole set K* of keys k.

Due to the initial choice of random sets of keys $k_1, \ldots, k_r$, the sensor network 1 is divided into specific areas, i.e. routable regions RR. The whole sensor network 1 depicted in the figure is divided into five routable regions, RR I to RR V. A routable region RR is characterized in that it only comprises sensor nodes 2 which have stored one (or no) key of one of the initially chosen set of keys $k_1, \ldots, k_r$.

Within a routable region RR the data sensed by the sensor node 2 is sent to the sink node 3 by means of reverse multicast traffic. Concretely, those sensor nodes 2 which have stored a key k, encrypt their data and send it via relay-nodes, which only forward data, and/or aggregator nodes, which aggregate the data of several sensor nodes 2 and forward it, to the sink node 3. Sensor nodes 2 which have no key k stored, cannot send own data themselves, but can only act as relay node or aggregator node.

The lifetime of the sensor network 1 is divided into epochs t, wherein the start of an epoch t is defined by a new choice of aggregator nodes. Along with the choice of the aggregator node, the validity of keys is defined, whereby within one routable region RR during one epoch t only one corresponding key is valid.

If the routable region RR I corresponds for example with the set of keys $k_1, \ldots, k_r$, and if key $k_i$ (as element of $\{k_1, \ldots, k_r\}$) is valid during the epoch t, during this epoch t only those sensor nodes 2 can send their data which have stored this key $k_i$. All the other sensor nodes 2 are either chosen as aggregator nodes, act as relay nodes in order to forward foreign data, or are in power save mode. The validity of the keys are changed cyclically, so i=t mod r is valid. In other words, during two different epochs t', t" with t'=t" mod r, the same key is valid respectively.

Finally, it is particularly important to point out that the example of an embodiment from above chosen arbitrarily only serves as an illustration of the teaching as according to the invention, but that it does by no means restrict the latter to the given example of an embodiment.

The invention claimed is:

1. A method for encrypted data transmission in a sensor network wherein the sensor network comprises a multitude of sensor nodes and at least one sink node and wherein the data traffic within the sensor network converges in the sink node, comprising:

selecting from a set K, a subset K* of keys k, and storing the selected subset K* in the individual sensor nodes together with corresponding key identifiers IDk;

each of the sensor nodes in a set of the sensor nodes selecting from the subset K* a random set of keys k1, ..., kr, the set of sensor nodes being within transmission range of the sink node and within a first hop of the sink node;

each of the sensor nodes in the set of sensor nodes respectively storing either exactly one key ki of the selected set of keys k1, ..., kr and erasing all the rest of the stored keys k of subset K*, or erasing all keys k of subset K*;

each of the sensor nodes in the set of sensor nodes sending a list of the key identifiers IDk1, ..., IDkr corresponding to its selected set of keys k1, ..., kr, the sent list of key identifiers being received by the sensor nodes in a further set of the sensor nodes that are farther from the sink node than the set of sensor nodes;

each of the sensor nodes in the further set of the sensor nodes receiving the list of key identifiers IDk1, ..., IDkr, respectively storing either exactly one key ki of the set of keys k1, ..., kr corresponding to the list and erasing all the rest of the stored keys k of subset K*, or erasing all the keys k of subset K*; and repeating the previous two steps with yet further sets of sensor nodes that are located farther away from the sink node until the farthest sensor node of the network is reached, and by doing so, the sensor network is divided into areas, denoted routable regions, in such a way that all the sensor nodes within one area have stored either exactly one or no key ki from the corresponding original selectable set of keys k1, ..., kr.

2. The method according to claim 1, wherein the subset K* of keys k is stored in the individual sensor nodes during a preparation phase before the deployment of the sink node and the sensor nodes.

3. The method according to claim 1, wherein the second and subsequent steps of the method are initiated by a request message sent from the sink node.

4. The method according to claim 1, wherein the sensor nodes are designed in such a way that they ignore all the lists of key identifiers IDk1, ..., IDkr which are received after the first receipt of a list of key identifiers IDk1, ..., IDkr.

5. The method according to claim 1, wherein the sensor nodes erase the subset K* completely from their memory if they do not receive a list of key identifiers IDk1, ..., IDkr within a configurable period of time after deployment.

6. The method according to claim 1, wherein a probability P with which sensor nodes do not store a key k of the key set k1, ..., kr decreases along with the increasing distance d from the sink node.

7. The method according to claim 6, wherein the probability P with which sensor nodes in a distance d from the sink node store a key k of the key set k1, ..., kr, is defined in relation to P(d, dmax)=d/dmax, wherein dmax means the biggest distance of a sensor node to the sink node.

8. The method according to claim 1, wherein some of the sensor nodes are selected as aggregator nodes which aggregate and forward the data of several sensor nodes.

9. The method according to claim 8, wherein—after a preconfigurable period of time defining an epoch—there is always a new choice of aggregator nodes performed.

10. The method according to claim 9, wherein in every single routable region during each epoch only one key ki of the corresponding set of keys k1, ..., kr is valid respectively.

11. The method according to claim 10, wherein characterized in that the correspondingly valid key ki of a set of keys k1, ..., kr changes cyclically.

12. The method according to claim 1, wherein the sensor nodes of the set of the sensor nodes from the first hop to the sink node which are responsible for the regulation of the number of the evolving routable regions decide whether they choose their own set of keys k1, ..., kr, or whether they take the set of keys k'1, ..., k'r of another sensor node of the set of the sensor nodes from the first hop to the sink node.

13. The method according to claim 12, wherein the number of routable regions is chosen in a way that is related to the square root of the number of the keys contained in the subset K*.

* * * * *